US00RE34442E

United States Patent [19]

Reiso

[11] E Patent Number: Re. 34,442

[45] Reissued Date of Patent: Nov. 16, 1993

[54] METHOD FOR PRODUCING AN ALUMINUM ALLOY

[75] Inventor: Oddvin Reiso, Sunndalsora, Norway

[73] Assignee: Norsk Hydro a.s, Oslo, Norway

[21] Appl. No.: 851,302

[22] Filed: Mar. 12, 1992

Related U.S. Patent Documents

Reissue of:

[64] Patent No.: 4,909,858
Issued: Mar. 20, 1990
Appl. No.: 221,417
Filed: Jul. 19, 1988

[30] Foreign Application Priority Data

Jul. 20, 1987 [NO] Norway ..... 873010

[51] Int. Cl.[5] ..... C22F 1/04

[52] U.S. Cl. ..... 148/550; 148/689; 148/691

[58] Field of Search ..... 148/550, 689, 691

[56] References Cited

U.S. PATENT DOCUMENTS 3,222,227 12/1965 Baugh et al. ..... 148/567

FOREIGN PATENT DOCUMENTS 0222479 5/1987 European Pat. Off. .
917385 2/1963 United Kingdom .
1052887 12/1966 United Kingdom .
1122198 7/1968 United Kingdom .

OTHER PUBLICATIONS

P. K. Sengupta et al., Journal of Materials Science Letters, vol. 5, No. 4, Apr. 1986, pp. 445–449.

*Primary Examiner*—R. Dean
*Assistant Examiner*—Robert R. Koehler
*Attorney, Agent, or Firm*—Wenderoth, Lind & Ponack

[57] ABSTRACT

In a method for producing an aluminum alloy, for instance to make a billet or ingot for extrusion purposes, and which may consist of a structural hardening Al-Mg-Si-alloy, the production comprises the following steps:

casting an ingot or billet, homogenizing the billet, cooling of the homogenized billet, reheating the billet to a temperature in the alloy above the solubility temperature in the precipitated phases in the Al matrix, for instance the solubility temperature for the Mg-Si-phases in a billet made of an Al-Mg-Si-alloy, holding the billet at the temperature above the solubility temperature for the precipitated phases in the Al matrix, for instance the Mg-Si-phases in a billet made of an Al-Mg-Si-alloy, until the phases are dissolved, quick cooling of the billet to the desired extrusion temperature to prevent new precipitation of said phases in the alloy structure, or that the billet is extruded at said solubility temperature[, until the phases are dissolved].

The above mentioned contributes to improve the extrudability for the billet, for instance by making it possible to increase the extrusion speed essentially.

6 Claims, 2 Drawing Sheets

METHOD FOR PRODUCING AN ALUMINUM ALLOY

Matter enclosed in heavy brackets [ ] appears in the original patent but forms no part of this reissue specification; matter printed in italics indicates the additions made by reissue.

The present invention relates to a method for producing an aluminum alloy, for instances by casting an ingot of a billet for extrusion purposes, and which may consist of a structural hardening Al-Mg-Si-alloy, such as 0,35–1,5 weight % Mg, 0,3–1,3 weight % Si, 0–0,24 weight % Fe 0–0,20 weight % Mn, 0–0,05 weight % Ti and rest Al with impurities up to a maximum of 0,05% each and totally 0,15%.

In extrusion plants producing aluminum extrusion, aluminum is supplied to extrusion presses in the form of billets of suitable size which are heated to a suitable temperature. The extrusion presses roughly consists of a cylinder/piston arrangement where the cylinder at one end is provided with a tool in the form of a die. The aluminum is forced through the die by means of the piston, thus forming an extrusion with the desired cross section or shape.

Due to the extrusion properties as well as the mechanical properties of the extrusion, mostly Al-Mg-Si-alloys are used when extruding aluminum, or more precisely alloys of the 6000-series, for instance, with a composition as mentioned initially.

The billet being used is produced by casting an aluminum alloy of the above-mentioned type, which after being cast is homogenized by annealing at high temperature and is thereafter cooled down and reheated to a desired extrusion temperature.

It is generally demanded that:

- the surface of the extrusions should have the best possible quality (no surface defects) and that
- the mechanical properties should be the best possible, simultaneously as it, due to production costs,
- is desired that the extrusion speed is the highest possible and that
- the energy consumption is as low as possible during the extrusion process (lowest possible extrusion pressure).

Previously, attempts have been done to reach optimum alloy compositions, and new methods for treating the above Al-alloys have been carried out to comply with the desired requirements or demands.

U.S. Pat. No. 3,222,227 describes a method for penetrating a billet of an aluminum alloy of the 6063 type. The billet is homogenized and thereafter, cooled down sufficiently fast to retain a sufficient amount of the magnesium and silicon in solid solution, preferably most of it, to prevail that any precipitates created are present in the form of small or very fine easily resolute $Mg_2Si$. Extrusions produced from such billets have, after ageing, improved strength and hardness properties. However, due to the quick cooling, the billet is unnecessarily hard, thus resulting in that the original extrusion speeds are lower and the extrusion temperature higher than is desired. Besides, preheating of the billet before extrusion has to be done most thoroughly and in a controlled way to avoid precipitation of a coarse beta phase, $Mg_2Si$ at this point of time.

In NO patent application No. 863864 is disclosed a billet made of a Al-Mg-Si-alloy and a method for producing such a billet, where it is an object to obtain control with the micro structure of the alloy by controlling the alloy composition and by controlling the casting conditions and more specifically the homogenization conditions. With regard to the realities of the application, it seems that the presumably new feature consist in that the billet, during the cooling process, is kept at a temperature of from 250° C. to 425° C. for some time to precipitate mainly all Mg as beta'-phase $Mg_2Si$, mainly with absence of beta-phase $Mg_2Si$. According to the application improved extrusion properties are achieved.

The extrusion properties of an alloy are determined with regard to which extrusion speed tearing is initiated on the surface of the extrusions, and with regard to which extrusion pressure is necessary to conduct the extrusion. Tearing is initiated during the extrusion in those parts of the extrusions, or rather those phases of the alloy when incipient melting occurs, cfr. later section. In this regard the Mg-Si phases have the lowest melting point.

Although the above application has for its object to reduce the size of the Mg-Si-phases in the billet, these phases will, even if the particle size is smaller, be present and incipient melting with tearing as a result will occur. The improved extrusion properties which are said to be achieved in the above NO application are thus of minor importance.

Neither does it seem to achieve any improvement with regard to a reduction of extrusion work nor mechanical properties for the extrusions.

The main object of the present invention is to provide a method for producing an Al-alloy, for instance by casting an ingot or billet for exrusion purposes, and which may consist of an Al-Mg-Si-alloy of the abovementioned type, where the extrusion properties are essentially improved and where the mechanical properties of the extrusions in the form of strength are substantially increased.

This is achieved according to the invention by for instance producing billets with the abovementioned alloy compositions under the following steps:

- casting a billet,
- homogenizing the billet,
- cooling the homogenized billet,
- heating the billet to a temperature in the alloy above the solubility temperature for the precipitated phases in the Al-matrix, for instance the solubility temperature for the Mg-Si-phases in a billet produced of an Al-Mg-Si-alloy, [until the phases are dissolved,]
- holding the billet at the temperature above the solubility temperature for the precipitated phases in the Al matrix, for instance the Mg-Si phases in a billet made of an Al-Mg-Si-alloy, until the phases are dissolved, and
- quick cooling of the billet to the desired extrusion temperature to prevent new precipitation of said phases in the alloy structure or that the billet is extruded at said solubility temperature.

The invention will be further described by means of examples and with reference to the drawings in which.

The present invention is based on the theory that incipient melting occurs at first in the coarse Mg-Si-phases of the metallic structure which has the lowest melting point, and that the tearing of the extrusion surface occurs at these sites when the temperature in the metal reaches the melting temperature for these phases.

If the coarse Mg-Si-phases are avoided, incipient melting is avoided, which again will result in that the extrusion speed may be increased. The Mg-Si-phases are dissolvable in all the 6000-alloys and will no longer be present if the metal is kept at a holding temperature above the solubility temperature.

Figure 1:
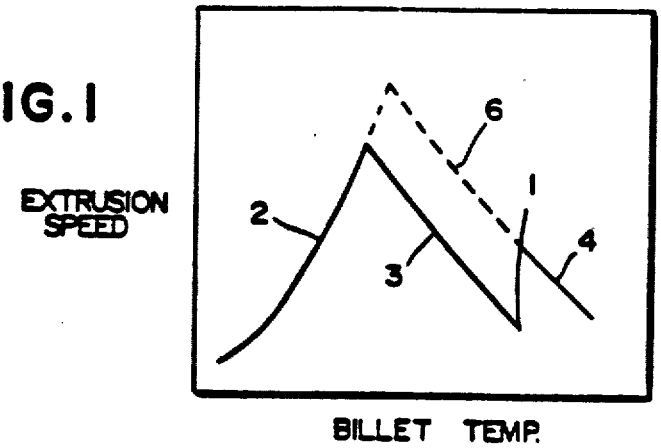
FIG. 1 shows a diagram (theoretical) where the maximum extrusion speed is drawn as a function of billet temperature directly before extrusion is performed.

Transferred to the "extrusion limit diagram" shown in FIG. 1, the above theory means that if the billet is heated to a sufficiently high temperature long enough to dissolve the Mg-Si-phases before extrusion, there will be a new peak appearing in the diagram, ref. pos. 1 in the diagram.

Besides, as to FIG. 1, the curve on the left hand side, pos. 2, shows the limit values for maximum press speed limited by the available extrusion pressure. The curve on the right hand side, pos. 3, shows the limit values for when tearing occurs in the metal due to incipient melting, while the curve all the way to the right, pos. 4, shows the limit values for when tearing occurs in the Al-matrix itself.

The above extra peak in the diagram is anticipated to occur only in alloys where incipient melting is expected to occur.

If the billets, as mentioned above at first are heated to a temperature above the solubility temperature for Mg and Si sufficiently long so that the Mg-Si-phases are dissolved and thereafter are cooled to a desired extrusion temperature quick enough to prevent precipitation of new, coarse Mg-Si-phases, it is possible to achieve a further increase in extrusion speed due to lower billet temperature. Thus, these billets will obtain an increase in extrusion speed compared to billets which are heated traditionally to the same temperature, cfr. the dashed line. pos. 6 in FIG. 1.

EXAMPLE

Performing extrusion tests to determine the extrusion properties for billets produced according to the invention vs. the extrusion properties for billets made of the same alloy, but produced in a conventional way.

Billets in the form of logs with a diameter of 228 mm were produced by casting an alloy, AA6063, and cut into lengths of 711 mm. The alloy composition is shown in the table below.

| Alloy | Mg | Si | Fe |
|---|---|---|---|
| AA 6063 | .60 | .48 | .17 |

The billets were homogenized according to standard practice, i.e. 6 hours at 582° C., and thereafter cooled down at a minimum cooling rate of 194° C/h in the interval 510° C.-204° C.

After the homogenization the billets were provided with sample numbers and heated according to a desired "temperature program".

The heating period for the billets was approximately 35 minutes. The samples which were cooled down prior to extrusion, were cooled down to a desired temperature without using any kind of forced cooling. The cooling period was up to 20 minutes for the lowest cooling temperature.

Figure 2:
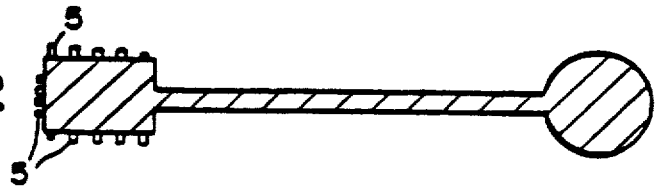
FIG. 2 shows a cross section of the extrusion die being used in connection with the extrusion tests.

After the above heating program was performed, the billets were extruded through a special die as shown in FIG. 2. The extrusion die is provided with recesses 5 which in the extrusions are revealed as small ribs. The expression "extrudability" is used as a definition for maximum extrusion speed V maks, which is achieved before tearing occurs in the ribs. With the present extrusion tests five different billets were used for each billet temperature, i.e. the temperature each of the billets had immediately before the extrusion was performed.

Figure 3:
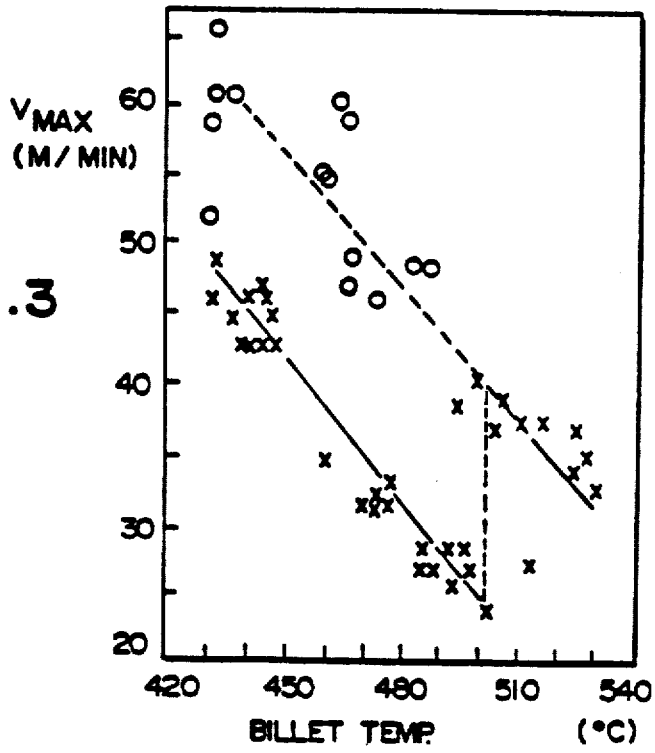
FIG. 3 shows a diagram where maximum extrusion speed is plotted vs. billet temperature directly before the extrusion is performed.

Maximum extrusion speed before tearing occured is plotted vs. billet temperature in FIG. 3. "X" represents billets which are heated directly to the desired extrusion temperature after homogenization in the conventional way, while "O" represents billets heated to a temperature above the solubility temperature and which are cooled down to the desired extrusion temperature. As indicated by the dotted line in FIG. 3, a significant increase (app. 60%) in extrusion speed is achieved by producing the billets according to the present invention.

From the phase diagram for the alloy (6063) being used in connection with the tests, the solubility temperature was estimated to be about 483° C., which quite correctly corresponds to the changes with regard to maximum extrusion speed, the break-through pressure for the billets and the surface temperature for the directly heated billets. As the coarse Mg-Si-phases are dissolved that extrusion speed will increase due to the changes in the mechanisms which initiate the tearing of the material. When these phases are present in the metal structure the tearing is anticipated to occur due to incipient melting. This occurs as previously mentioned due to the fact that the material contains small agglomerates of phases which have a lower melting point than the rest of the material. These agglomerates may for instance consist of $Mg_2Si+Si+Al$ (liquid at 555° C.), or AlFe (Mn)$Si+Mg_2Si+Si+Al$ (liquid 548° C.). When these temperatures are [exeeded] *exceeded* during the extrusion of the metal, incipient melting will occur and cause surface defects like tearing.

Figure 4:
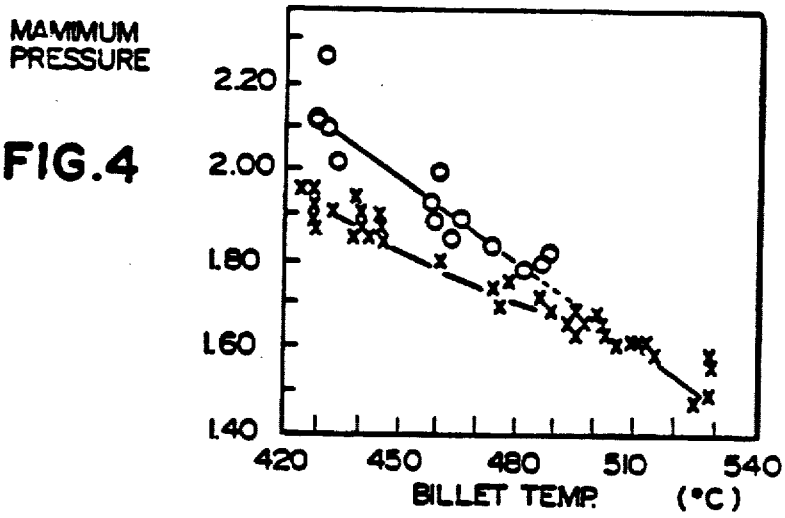
FIG. 4 shows a diagram where maximum extrusion pressure is plotted vs. the billet temperature.

In FIG. 4 the break-through pressure for the extrusion (the maximum pressure registered before the extrusion is started) is plotted vs the the billet temperature. The curve passing through the points "O" defines the maximum, average pressure for billets extruded according to the invention, while the slightly less inclining curve passing through the points "X" defines the average, maximum pressure which was measured for the billets extruded the conventional way, i.e. billets directly heated to the desired extrusion temperature.

As can be seen from the figure, a slight increase in extrusion pressure is registered for the billets produced according to the present invention. This supposingly has to do with the larger amounts of Mg and Si dissolved in the solid solution in the metal than what is the case with the billets produced conventionally. The small increase in extrusion pressure is however unimportant compared to essential increase in extrusion speed for the billets produced according to the present invention.

With regard to surface quality, the amount of "pick up" (surface defect), was determined by visual inspection of each extrusion sample and graded with regard to surface quality. Group I was with the finest surface and group III with the roughest surface. The samples were graded as follows:

| Sample No. | Billet temperature | Grading |
|---|---|---|
| 1 | 442 | III |
| 2 | 432 | III |
| 3 | 446 | II |
| 4 | 477 | II |
| 5 | 488 | II |
| 6 | 506 | I |
| 7 | 511 | I |
| 8 | 527 | I |
| 9[x] | 466 | I |
| 10[x] | 466 | I |
| 11[x] | 430 | I |

[x]Cooled down from 538° C.

As can be seen from the above table, the surface quality is significantly improved by increasing extrusion temperature.

Further the samples extruded from billets produced according to the present invention have essentially better quality (less "pick-ups")) than the samples extruded from billets produced according to the conventional method.

Testing of mechanical properties.

After the extrusion was performed, the extrusions were water guenched at the press (standing wave) and samples were aged at 185° C. for five hours.

Two parallel samples of the aged extrusions was provided for tensile stress tests. The samples were taken from the middle, flat part of the extrusions. The results from the tests are revealed in the table below.

| Sample No. | Billet temp. | Rpo 2 N/mm$^2$ | Rm N/mm$^2$ | Elongation % |
|---|---|---|---|---|
| 1[x] | 442 | 221 | 241 | 13.5 |
| 2[x] | 432 | 213 | 234 | 12.9 |
| 3[x] | 446 | 245 | 263 | 10.7/13.2 |
| 4[x] | 477 | 258 | 274 | 13.7 |
| 5[x] | 488 | 258 | 274 | 8.6/14.0 |
| 6[x] | 506 | 260 | 275 | 12.5 |
| 7[x] | 511 | 262 | 276 | 12.7 |
| 8[x] | 527 | 263 | 276 | 13.4 |
| 9[o] | 466 | 252 | 266 | 13.5 |
| 10[o] | 466 | 259 | 271 | 12.8 |
| 11[o] | 430 | 256 | 269 | 11.9 |

[o]Billets cooled down from 538° C.
[x]Billets produced according to the conventional method.

Figure 5:
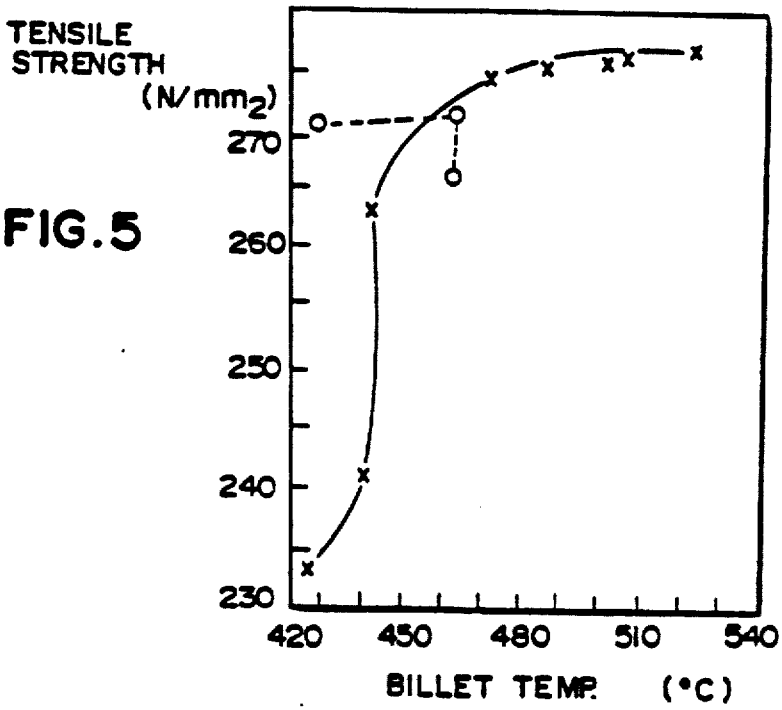
FIG. 5 shows a diagram where ultimate tensile strength is plotted vs. the billet temperature.

In FIG. 5 the values (tensile strength) revealed in the table are plotted vs the billet temperature.

As can be seen from FIG. 5, the strength of the material increases by increasing billet temperature (billet temperature immediately before extrusion). Further it can be seen that the extrusions which were extruded from billets produced according to the present invention have essentially improved strength compared to the extrusions produced according to the conventional method, especially for the ones having low billet temperature.

As a conclusion with regard to the above-mentioned examples it is determined that billets extruded according to the present invention have improved properties, both with regard to extrusion speed, surface quality and strength compared to billets extruded according to the conventional method.

Besides the tests being carried out for the alloy AA 6063 and which have been mentioned above, there have been done corresponding tests for another alloy, more precisely AA 6351. The results from the tests with this alloy reveals the same improvements regarding extrusion speed, surface quality and strength as the alloy AA 6063.

On the basis of these results and on the basis of the theoretical reasoning previously mentioned, it will be apparent that the present invention being defined in the accompanying claims is not limited to only the Al-Mg-Si-alloys of the 6000-series, but is applicable to all Al-alloys where incipient melting occurs due to precipitated phases which are soluble at higher temperatures. Further, it is anticipated that the method according to the present invention also may be used for other alloys than the aluminum alloys, for instance the cooper alloys.

I claim:

1. A method for producing an aluminum alloy, which comprises the following steps:
   casting an ingot or billet;
   homogenizing the billet;
   cooling the homogenized billet;
   reheating the cooled billet to a temperature in the alloy above the solubility temperature of the precipitated phases in the Al matrix;
   holding the billet at the temperature above the solubility temperature for the precipitated phases in the Al matrix until the phases are dissolved; and
   quick cooling the billet to the desired extrusion temperature to prevent new precipitation of said phases in the alloy structure [, or extruding the billet at said solubility temperature until the phases are dissolved].

2. The method according to claim 1, wherein said alloy is a structural hardening Al-Mg-Si-alloy.

3. The method according to claim 2, wherein the alloy consists essentially of 0.35–1.5 weight % Mg, 0.3–1.3 weight % Si, 0–0.24 weight % Fe, 0–0.20 weight % Mn, and 0–0.05 weight % Ti, with the balance being Al and impurities up to a maximum of 0.05 each and 0.15% totally.

4. The method according to claim 1, wherein said reheating is to a temperature in the alloy above the solubility temperature for the Mg-Si-phases in a billet made of an Al-Mg-Si-alloy.

5. The method according to claim 1, wherein said holding is at a temperature above the solubility temperature for the Mg-Si phases in a billet made of an Al-Mg-Si-alloy.

6. The method according to claim 1, wherein the billet is cast by means of a short forming or hot top direct chill casting process.

* * * * *